(No Model.)
F. G. SUSEMIHL.
MANUFACTURE OF METAL WASHERS.
No. 417,952. Patented Dec. 24, 1889.
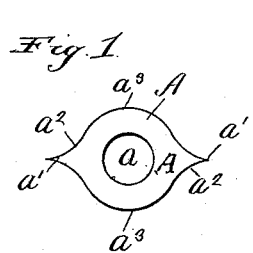
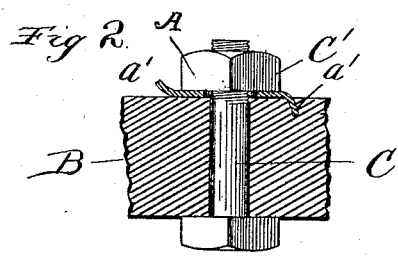
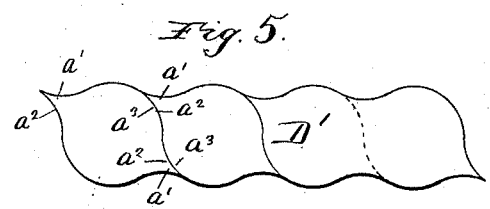
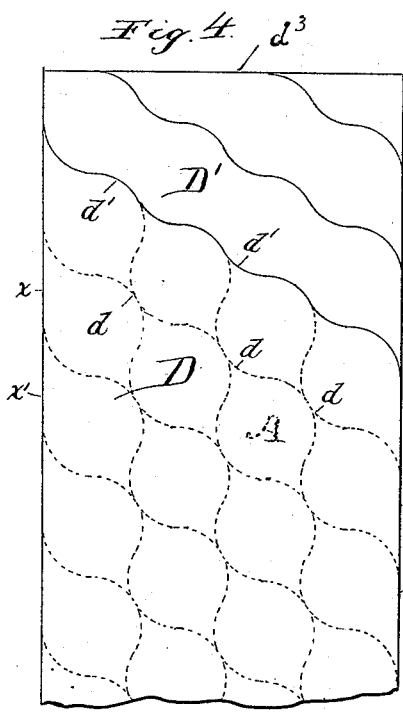
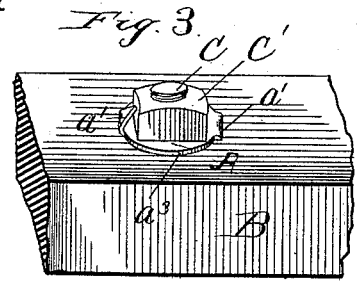
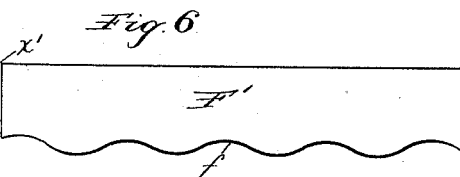
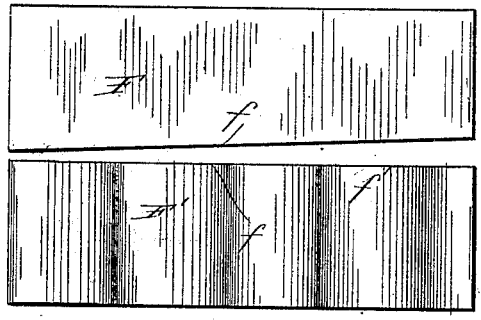
Witnesses:
Lew. E. Curtis,
Mack A. Claflin.
Inventor:
Francis G. Susemihl
By Munday Evarts & Adcock
his Attorneys.
N. PETERS, Photo-Lithographer, Washington, D. C.

UNITED STATES PATENT OFFICE.

FRANCIS G. SUSEMIHL, OF DETROIT, MICHIGAN, ASSIGNOR OF ONE-HALF TO EUGENE R. HUTCHINS, OF CHICAGO, ILLINOIS, AND CHARLES H. HUTCHINS, OF DETROIT, MICHIGAN.

MANUFACTURE OF METAL WASHERS.

SPECIFICATION forming part of Letters Patent No. 417,952, dated December 24, 1889.

Application filed November 19, 1888. Serial No. 291,204. (No model.)

*To all whom it may concern:*

Be it known that I, FRANCIS G. SUSEMIHL, a citizen of the United States, residing in Detroit, in the county of Wayne and State of Michigan, have invented a new and useful Improvement in the Manufacture of Metal Washers, of which the following is a specification.

My invention relates to improvements in the manufacture of sheet-metal washers.

Heretofore sheet-metal washers have usually been made of a circular shape, being stamped out of the metal plate or sheet by ordinary round or circular dies or punches. Such dies, having circular cutting-edges, are expensive to make and to keep in repair, are not very durable, and require expensive and powerful presses, as well as a great amount of power to operate them, and the process of making the washers by such stamping-dies is also comparatively slow, so that the cost of manufacturing the washers in this way is considerable. This cost is also somewhat increased by the waste metal left in the spaces between the contiguous washers as they are cut or punched from the sheet, which is not utilized at all in the manufacture of the washers. In addition to this the washers so produced are simple plain washers, which can serve no other function or use than merely as washers.

The object of my invention is to provide a cheaper and more expeditious method or process of making washers which will require much less force or power to operate the tools, and in which the necessary tools may be of a more simple and inexpensive character both to make and to keep in working order, and whereby, also, the washers may be cut from the sheet without any waste of material, and whereby at the same time, also, the washers may be furnished with sharp-pointed projections to serve as nut-locks.

In my invention the washers are severed from the sheet by two successive steps or cuts by shears having waved or ogee-curved edges, each convex curve of the shear cutting one-sixth the circumference of one washer and the adjoining concave curve cutting one-sixth the circumference of the adjoining washer, the first step or cut severing the sheet into strips having waved or concavo-convex marginal lines, and the second step or cut severing the individual washers from the concavo-convex strips on an ogee curve. The washers as thus cut from or arranged in the sheet are each tangential to six adjoining ones, so that the greatest possible number of washers may be formed from the sheet, the washers in one row or strip being arranged midway between the washers in the next adjoining row or strip, so that they counter each other. In this way intermediate parts of the sheet between the washers, which heretofore have been thrown away as waste, remain attached as two acute concave-curved points or projections to each washer, and I utilize the same to form a nut-lock on each washer. This I do by turning one of the sharp points down, preferably about at right angles, so that it may enter the wood, and the other point being preferably slightly inclined upward or in the opposite direction, so that it may be more conveniently bent or hammered up against the face of the nut after the nut is applied to the bolt.

By my process it will thus be observed that much less force is required to cut the washer from the sheet, because, first, only two-thirds of the entire circumference of each washer is cut, instead of the whole circumference, as heretofore, so that only two-thirds the amount of cutting is done, and, second, the cutting may be done by a shearing cut, the shears entering the sheet at one edge and passing through it, which requires much less force than where the cutting is done by dies or punches.

In the accompanying drawings, which form a part of this specification, and in which similar letters of reference indicate like parts, Figure 1 is a plan view of a washer made according to my invention. Fig. 2 is a sectional view illustrating the use of the washer as a nut-lock, and showing the same before the nut-holding point is bent up against the face of the nut. Fig. 3 is a perspective view showing the holding-point bent up against the nut. Fig. 4 represents a plate or sheet of metal from which the washers are cut, the dotted lines showing how the washers are arranged upon or cut from the sheet, and the heavy ogee or waved lines illustrating the lines upon which the concavo-convex strips are severed from the sheet by the first step or cut of the process. Fig. 5 represents one of the concavo-convex washer-strips as cut from the sheet, the ogee lines diagonally crossing the same showing the lines or cuts severing the individual washers from the strip. Fig. 6 is a plan or edge view of one shear by which the cutting is done, and Fig. 7 is a side elevation of the shears.

In said drawings, A represents the washer, having the usual central bolt-hole $a$ and provided with two acute concave curved points $a'$, diametrically opposite each other. The concave curved sides, margin, or edges $a^2$ of these points $a'$ form ogee curves with the circular marginal curves $a^3$ of the washer A. One of the concave curved points $a'$ is bent or curved at an angle to the plane of the washer, so that it may enter the wood B, as indicated in Fig. 2, and thus prevent the washer from turning on the bolt C. The other point $a'$ is preferably inclined slightly in the opposite direction to facilitate the bending or hammering of the same up against the face of the nut C', after the nut is screwed home, to lock the same in such position as is indicated in Fig. 3. This other point $a'$ should, however, only be bent slightly at first, as indicated in Fig. 2, so that the point will not project in the way of the nut as it is being screwed on the threaded bolt.

D represents a sheet or plate of metal from which the washers A are cut, the dotted lines $d$ showing the lines upon which the cuts are made to sever the washers A from the sheet. The heavy ogee or concavo-convex curved lines $d'$ represent the lines upon which the sheet is sheared or cut to form the waved or concavo-convex curved washer-strips D'. The cuts or lines $d'$ are preferably made diagonally with the sheet, (on the angles of sixty degrees and thirty degrees with its right-angle edges $d^2$ and $d^3$,) as thereby there will be less waste at the margin of the sheet.

F and F' represent a pair of shears having waved ogee or concavo-convex curved cutting-edges $f$, corresponding, of course, in form to the lines $d'$, upon which the sheet A is to be severed. One of these shears—the lower one F, for example—may be stationary, and preferably have a level or horizontal face or cutting-edge $f$. The other shear F' reciprocates vertically and has its cutting face or edge $f$ inclined at an angle to the cutting face or edge of the shear F, so as to produce the shearing action or cut as said shear F descends upon the sheet D, which is placed between the shears. The shears are operated in the usual manner in a press of any ordinary construction familiar to those skilled in the art. After the sheet D is thus severed and sheared into strips D' the individual washers A may be severed from the strip D' by the same shears F F', as the ogee-curved faces or cutting-edges $f f$ are the same as the ogee curves $a^2 a^3$, dividing the individual washers A A in the strip D'; but it is preferable to employ a separate pair of shears or tools to sever the washers A from the strip D', in order that said shears may be furnished with punching-dies for simultaneously forming the bolt-hole $a$ in the washer as it is severed, and also preferably with dies for bending or inclining the points $a'$, as before described. The bolt-hole $a$ and the bending of the points $a'$ may, however, be done at any time or in any way desired or preferred.

By referring to Fig. 4 it will be observed that the washers A in the diagonal row marked $x$, for example, fall midway between or counter the washers A in the next succeeding diagonal row, (marked $x'$,) so that each washer in the row $x$ is tangent to two washers in the adjoining row $x'$, and that the lines joining the centers of any three contiguous washers form equilateral triangles.

Each washer A has a circular edge for two hundred and forty degrees, or two-thirds of its circumference, the remainder of its boundary being formed by the acute-angled concave-curved points $a'$, the curves of which form ogee curves with the circular parts $a^3$ of the washer with which they unite.

I claim—

1. The method or process of cutting washers consisting in first shearing the sheet into ogee or concavo-convex curved strips, and, second, cutting the individual washers from said strip on ogee-curved lines, substantially as specified.

2. The process of cutting washers consisting in first shearing the sheet into ogee-curved strips, the curves whereof are parts of circles about the centers of the adjoining washers to be cut from the sheet, and then dividing such strips on ogee-curved lines extending across such strips, the curve of said cross-lines being parts of circles about the centers of the adjoining washers in the strip, substantially as specified.

3. The process of making nut-lock washers consisting in cutting the washers from the sheet in successive rows, the washers in one row countering the washers in the adjoining rows, so that each washer is tangent to six surrounding or adjacent washers in the sheet, and about two-thirds the circumference of each washer only being cut on a circle about the center thereof, whereby two acute concave-curved nut-locking points are left on each washer, substantially as specified.

FRANCIS G. SUSEMIHL.

Witnesses:
 EDMUND ADCOCK,
 H. M. MUNDAY.